United States Patent [19]

Bryant

[11] 4,006,453
[45] Feb. 1, 1977

[54] DUAL DIRECTIONAL AND BRAKE LIGHT CONTROL FOR TRAILERS

[76] Inventor: Richard C. Bryant, 5017 Wheeler, LaVerne, Calif. 91750

[22] Filed: Aug. 21, 1975

[21] Appl. No.: 606,704

Related U.S. Application Data

[63] Continuation-in-part of Ser. No. 510,791, Sept. 30, 1974, abandoned, which is a continuation-in-part of Ser. No. 341,628, March 14, 1973, abandoned.

[52] U.S. Cl. .............................. 340/67; 307/10 LS; 315/77
[51] Int. Cl.² .......................................... B60Q 1/38
[58] Field of Search ........ 340/67; 307/10 R, 10 LS; 315/77

[56] References Cited

UNITED STATES PATENTS

| | | | |
|---|---|---|---|
| 3,576,530 | 4/1971 | Buechler et al. | 340/67 |
| 3,596,244 | 7/1971 | Litke | 340/67 |
| 3,659,267 | 4/1972 | Holt | 340/67 |
| 3,740,714 | 6/1973 | Ballou | 340/67 |
| 3,849,664 | 11/1974 | Bryant | 307/10 LS |
| 3,883,845 | 5/1975 | De Vita | 340/67 |
| 3,896,415 | 7/1975 | Carter | 340/67 |

Primary Examiner—Glen R. Swann, III
Attorney, Agent, or Firm—Herbert E. Kidder

[57] ABSTRACT

A device for adapting combined brake and turn signal lights on a trailer to independent brake signal and turn signal lights on a towing vehicle has two circuits, one for each side, each circuit having a brake signal switch, such as a transistor, silicon-controlled rectifier or relay connected between the brake signal circuit of the vehicle and the filament of the combined brake and turn signal light on the corresponding side of the trailer. The brake signal switches are selectively actuated by impulses received from the corresponding turn signal flashers on the vehicle, to block the brake signal current to the corresponding signal light on the trailer. In one embodiment of the invention, voltage-sensitive switches (e.g., SCR) are connected to brake switch transistors, and the left-hand and right-hand turn signal circuits on the vehicle are connected through diodes to the corresponding signal lamps on the trailer, and also to their respective switches. When brakes are applied and turn signals simultaneously operated, the flashing turn signal triggers the voltage-sensitive switch on that side, causing the transistor to switch off, which prevents the brake circuit from lighting the combined lamp filament on that side while the filament is being flashed by the turn signal. The lamp on the other side remains lighted by the brake circuit. In another embodiment, relays or transistors are connected to the turn-signal circuits and brake signal circuits on each side of the towing vehicle in such a way that when one turn signal is operating the brake signal for that side is blocked by the turn signal voltage, and is passed when the turn signal voltage is off. Thus, the trailer turn signal lamp on the one side blinks at the same rate as the turn signal lamp on the vehicle, but 180° out of phase with the latter.

8 Claims, 4 Drawing Figures

DUAL DIRECTIONAL AND BRAKE LIGHT CONTROL FOR TRAILERS

CROSS-REFERENCE TO RELATED APPLICATIONS:

This application is a continuation-in-part of my co-pending application Ser. No. 510,791, filed Sept. 30, 1974 now abandoned, which in turn is a continuation-in-part of then-pending application Ser. No. 341,628, filed Mar. 14, 1973 now abandoned.

BACKGROUND OF THE INVENTION

The present invention pertains to a device for adapting combined brake and turn signal lights on a trailer to the independent brake and turn signal lights on a towing vehicle. There are two systems for actuating the turn signal and brake signal lamps in use in most vehicles in this country, often resulting in incompatability between the towing vehicle and the towed vehicle. One system, most commonly found on foreign-made cars, provides separate and independent lamps, or lamp filaments, for brake and directional turn indicators. The other, used on all American-made cars and some late-model foreign cars, combines these two functions into a single lamp for brake signal and turn signal indicators. In the latter case, there are separate left- and right-hand lamps, both of which light up for brake signals, while the left-hand lamp flashes for left turn signal and the right-hand lamp for right turn signal. The electrical system of the vehicle provides means for inactivating the brake signal of the lamp on that side for which the turn signal is operating, so that when the right-hand turn signal is flashing, only the left-hand lamp is lighted by the brake signal, and vice versa. When this latter system is employed in a towing vehicle, and the former system on a trailer, the interface connections are limited to directional signal only or brake signal only, as the towing vehicle does not provide any means for inactivating the brake signal when the directional indicator is being operated.

Heretofore, the only legal solution to the problem has been to install an additional set of lights on the trailer to match those of the towing vehicle. This is a tedious and time-consuming process, which not only detracts from the aesthetic appearance of the trailer, but also makes the wiring incompatible with that of a towing vehicle having the combined turn signal and brake signal system.

SUMMARY OF THE INVENTION

The primary object of the present invention is to provide an adaptor which enables a trailer having the combined turn signal and brake signal light system to be towed behind a vehicle having the independent turn signal and brake signal lamps.

Another object of the invention is to provide a device of the class described having means for inactivating the brake signal lamp on one side of the trailer when the turn signal on that side is being operated.

A further object of the invention is to provide a device of the class described which is compatible with all vehicles having a 12-volt, negative ground electrical system, which is extremely compact, simple to install, and highly reliable.

These and other objects and advantages of the invention will become apparent to those skilled in the art from the following detailed description of the preferred embodiment thereof, with reference to the accompanying drawings.

Figure 1:
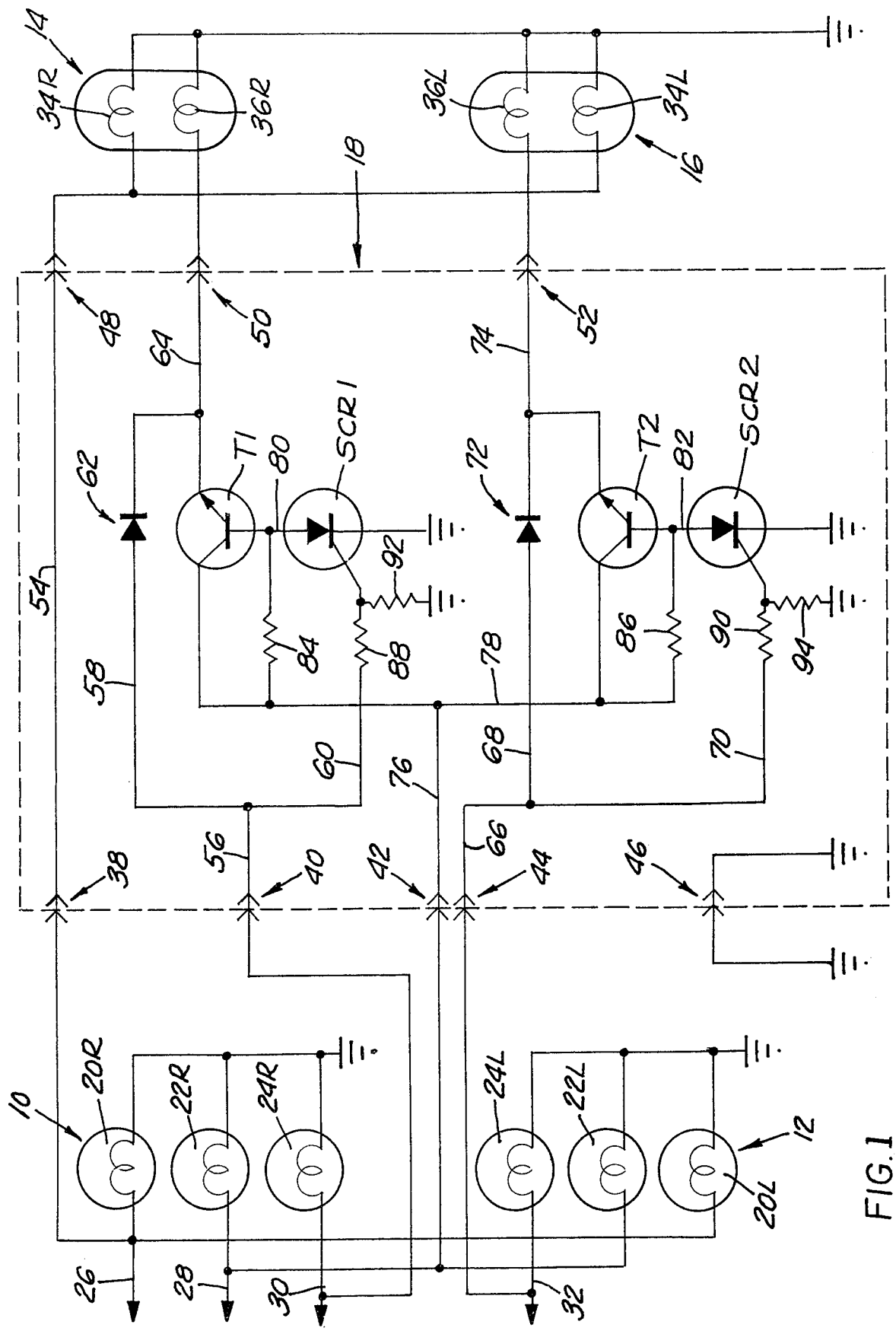
FIG. 1 is a circuit diagram of one embodiment of the invention.

DESCRIPTION OF THE PREFERRED EMBODIMENTS:

In the first embodiment of the invention, shown in FIG. 1, reference numeral 10 designates the group of right-hand signals for the towing vehicle, while reference numeral 12 designates the left-hand signal lights. The right-hand signal light of the trailer is shown at 14, and the left-hand signal light of the trailer is designated by the numeral 16. Reference numeral 18 designates, in its entirety, the adaptor device of the present invention, which enables the lights of the trailer to be actuated in a legal manner by the brake signal and turn signal circuits of the towing vehicle, as will be described hereinafter.

The signal lights of the towing vehicle consist of two groups of three each, with each group being arranged on the opposite sides of the car at the rear end thereof. Lights 20R and 20L are the taillights (or clearance lights) on the right-hand and left-hand sides of the car, respectively. Lights 22R and 22L are the brake signal lights on the right and left sides of the car, respectively. Lights 24R and 24L are the right-turn and left-turn signal lights, respectively, of the towing vehicle. The clearance lights 20R and 20L are connected to the light circuit 26 of the vehicle, which causes the lights to go on when the headlights are turned on. Brake signal lights 22R and 22L are connected to a brake signal light circuit 28, and both of these lights go on simultaneously when the brakes are actuated. Right-turn signal light 24R is connected to right-turn signal circuit 30, and left-turn signal light 24L is connected to left-turn signal circuit 32, so that the appropriate signal light is caused to flash when the turn signal lever is moved one way or the other by the driver.

The system shown in the drawings, wherein the right-hand and left-hand signal lights 10 and 12 each have three separate lamps, or three separate filaments, each of which has a separate function, is most commonly used on foreign-made cars, whereas all American-made cars and some late-model foreign cars have the two functions of turn signal and brake signal embodied in a common filament, with means provided in the electrical system of the vehicle for inactivating the brake signal of the lamp on that side for which the turn signal is operating, so that when the right-hand turn signal is flashing, only the left-hand lamp is lighted by the brake signal, and vice versa. Thus, when a trailer having the combined lights, as indicated at 14 and 16 in the drawings, is towed behind a vehicle having separate and independent signal lamps, such as 10 and 12, the trailer lights are incompatible with the electrical system of the towing trailer, and some modification of the system must be made if the lights of the vehicle are to be operated in a legal manner. This is accomplished in the present invention by the device 18, which supplies a brake-inhibiting action in the signalling circuit, that is normally provided in the electrical system of an automotive vehicle having the combined lights 14 and 16.

In the trailer lights 14 and 16, there are two lamps, arranged on opposite sides of the vehicle, each of which has two filaments. Filaments 34R and 34L are the clearance light filaments, which light up simultaneously when the vehicle lights are turned on, and function as taillights. Filament 36R is a common brake signal and right-turn signal filament for the right-hand light 14, while filament 36L is the common brake signal and left-turn signal filament for the left-hand signal light 16.

The device 18 is preferably a solid-state circuit; and may be enclosed within a relatively small housing, or box, having five input connections 38, 40, 42, 44 and 46, each of which is a quick-disconnect, plug-in, electrical connection to corresponding circuits in the automobile. Output connections 48, 50 and 52 are provided, which permit quick connection to the signal lights of the trailer, and these are also preferably quick-disconnect, plug-in electrical connections.

Electrical line 54 within the circuit 18 connects the input connection 38 with output connection 48, and this provides electrical connection between the taillight circuit 26 of the vehicle to the two clearance light filaments 34R and 34L of the trailer lights 14 and 16. Line 56 connects to input connection 40, which goes to the right-turn signal light circuit of the vehicle. Line 56 connects to branch lines 58 and 60. Connected into the line 58 is a diode 62, the other side of which goes to a line 64 connected to output connection 50. Connection 50 is joined to the common brake signal and turn signal filament 36R.

The left-hand signal lights of the towing vehicle are similarly connected to the left-hand signal lights of the trailer. Line 66 connects to input connection 44, going to the left-hand signal circuit of the vehicle, and also branches through lines 68 and 70. Line 68 has a diode 72 connected therein, which connects at its other end to the line 74 going to output terminal connection 52. Output connection 52, as mentioned earlier, is connected to filament 36L of the left-hand signal light 16.

An electrical line 76 is connected to input connection 42, which is connected, in turn, to the brake signal circuit 28 of the vehicle. Line 76 is connected to line 78, which includes branches going to the collector of each of two transistors T1 and T2. The emitter of transistor T1 is connected to line 64, while the emitter of transistor T2 is connected to line 74. The base of transistor T1 is connected to silicon-controlled rectifier SCR1 by a wire 80, while the base of transistor T2 is connected to another silicon-controlled rectifier SCR2 by a wire 82. Line 78 is connected through a resistor 84 to line 80, and through resistor 86 to line 82. Silicon-controlled rectifier SCR1 is connected through resistor 88 to lines 60 and 56, and thence to right-turn circuit 30. The other silicon-controlled rectifier SCR2 is connected through resistor 90 to line 70, which goes to line 66, and thence to left-turn signal circuit 32. Silicon-controlled rectifiers SCR1 and SCR2 are also connected through resistors 92 and 94, respectively, to ground.

Input connection 46 provides a ground connection between the device 18 and the vehicle, so that the silicon-controlled rectifiers SCR1 and SCR2 can be grounded, as shown. Other ground connectors for the lamp filaments are as shown.

The two transistors T1 and T2 are essentially brake signal switches, which transmit current from the brake signal circuit of the car to the common filament 36R and 36L of the lights 14, 16 on the trailer vehicle when the transistors are conducting. Normally, transistors T1 and T2 are conductive as long as they are not influenced by their respective silicon-controlled rectifiers SCR1 and SCR2. The silicon-controlled rectifiers are voltage-sensitive switches, which respond to current from the turn signal circuit of the vehicle to switch the associated transistor to the non-conductive state. Thus, when the right-turn signal flasher is operating, SCR1 is activated, causing transistor T1 to switch to the non-conductive state, thereby preventing current from the brake signal circuit 28 from reaching filament 36R of the trailer lights. Since the left-hand voltage-sensitive switch SCR2 is not affected, transistor T2 remains conductive, and continues to transmit current from the brake signal circuit of the vehicle to the common filament 36L of the left-hand signal light 16. Thus, as long as the turn signal flasher is operating, the brake circuit to the lamp on that side of the trailer is inhibited, and the only current transmitted to the common filament is that which comes from the turn signal circuit, and by-passes the transistor through the diode 62 or 72.

Figure 2:
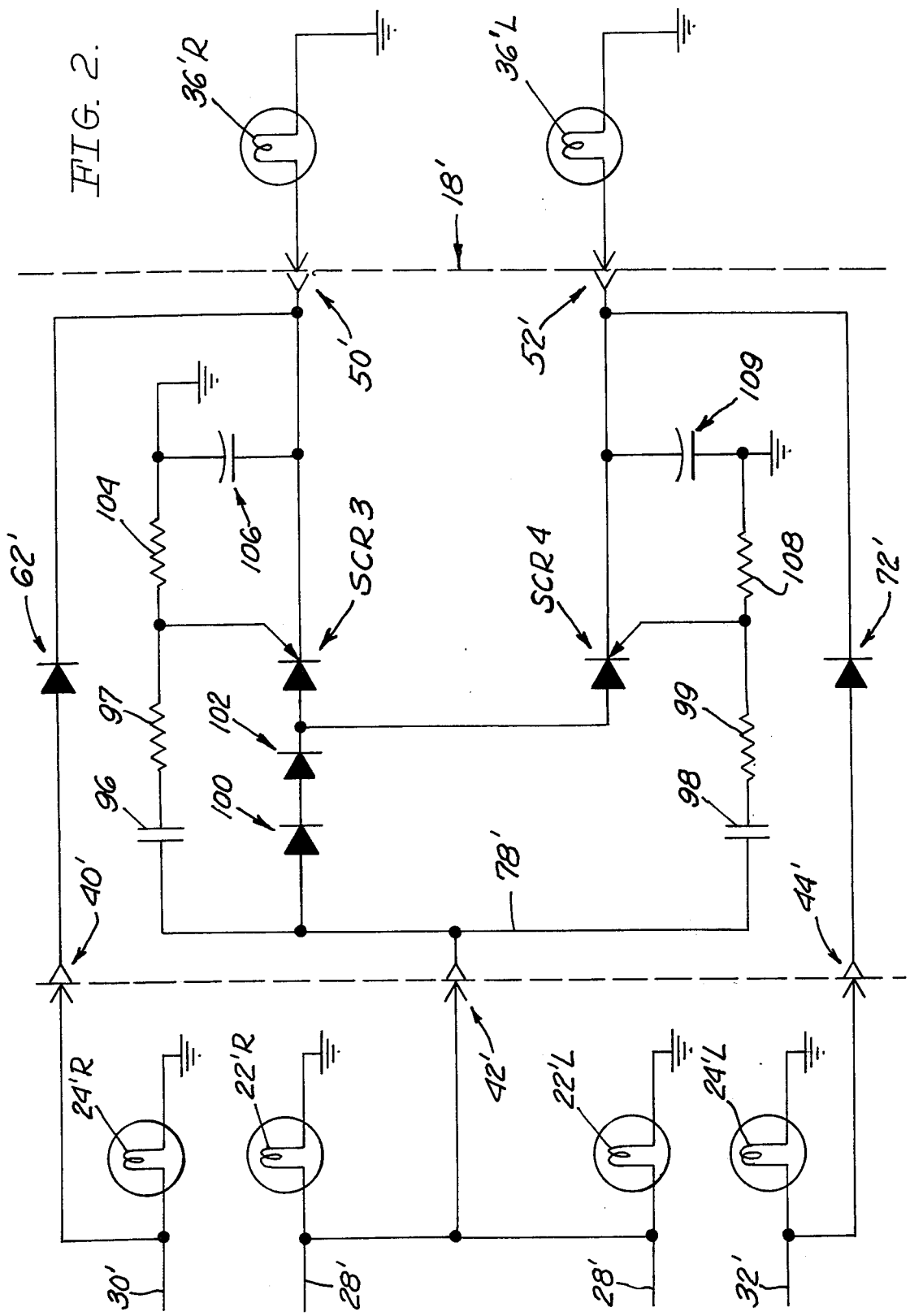
FIG. 2 is a circuit diagram of a second embodiment.

Another embodiment of the invention is illustrated in FIG. 2, to which attention is now directed. In this embodiment, parts that are identical to or similar in function to their counterparts in FIG. 1 are given the same reference numerals with a prime (') suffix. The taillights (or clearance lights) have been omitted from the circuit diagram of FIG. 2 in the interests of simplicity, as the circuits for these taillights would be the same in both embodiments.

The turn signal lights of the vehicle are designated 24'R and 24'L, respectively, the brake signal lights are designated 22'R and 22'L, respectively; and the combined brake-and-turn-signal lights of the trailer are designated 36'R and 36'L. In each case, R and L indicate "right-hand" and "left-hand" respectively. The brake signal circuit of the vehicle is 28', and the right-hand signal circuit of the vehicle is 30', while the left-turn signal circuit of the vehicle is 32'.

The adaptor device 18' has plug-in sockets 40', 42', and 44' to receive connector plugs on the vehicle, and other plug-in sockets 50' and 52' to receiver connector plugs on the trailer. Diode 62' connects the right-turn circuit 30' of the vehicle to the filament of the signal lamp 36'R on the trailer, and a second diode 72' connects the left-turn circuit 32' of the vehicle to the filament of the signal lamp 36'L on the trailer.

A right-turn signal from the corresponding turn signal circuit 30' of the vehicle will pass through the diode 62' and cause the right turn/brake light 36'R on the trailer to flash. At the same time, the turn signal causes silicon-controlled rectifier SCR3 to be back-biased so that it becomes non-conductive and therefore blocks any electrical signal from the brake signal circuit 28' of the vehicle.

A brake signal from the vehicle will be applied simultaneously to the gate of SCR3 via capacitor 96 and resistor 97, and to the gate of SCR4 via capacitor 98 and resistor 99, as well as the anodes of SCR3 and SCR4 via series-connected diodes 100 and 102, causing both silicon-controlled rectifiers to fire and illuminate both the turn-brake lamps 36'R and 36'L.

If both a right-turn signal and brake signal occur simultaneously, SCR3 and SCR4 will fire, illuminating the right turn/brake lamp 36'R and the left turn/brake lamp 36'L. However, when the right-turn signal appears, the cathode voltage on SCR3 will exceed the anode voltage, owing to the fact that the two series-connected diodes 100 and 102 produce a 1.4 volt (nominal) drop, whereas diode 62' only produces a 0.7 voltage drop, and as a result SCR3 is "quenched". SCR3 will not fire again until a new brake action occurs, due to the charge on capacitor 96 which prevents the gate from being triggered.

Resistor 104 is the discharge path for capacitor 96 to ground, and capacitor 106 prevents transients from inadvertently triggering SCR3.

The left-hand turn-and-brake circuitry are identical to that described above, with capacitors 98 and 109 having the same functions as capacitors 96 and 104, respectively, and resistors 99 and 108 having the same functions as resistors 97 and 104, respectively.

Figure 3:
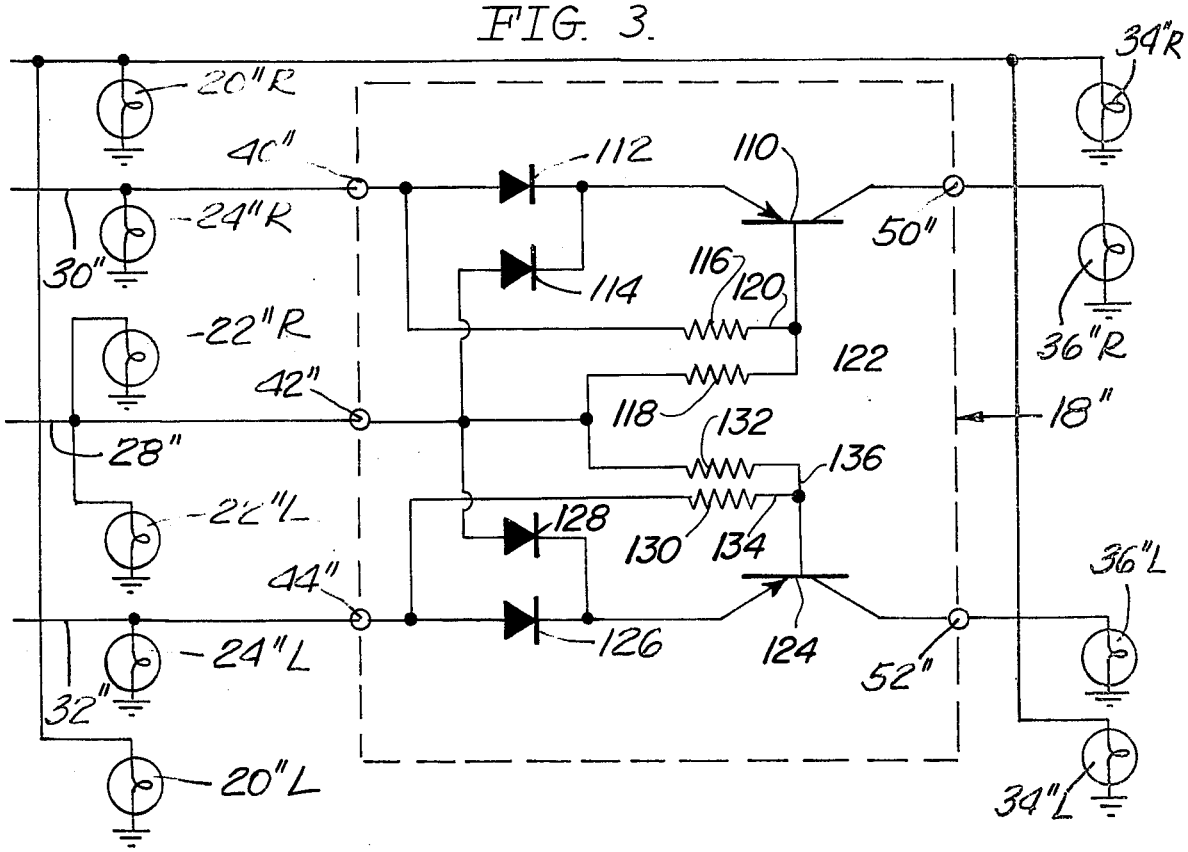
FIG. 3 is a circuit diagram of a third embodiment of the invention.

FIG. 3 shows another embodiment of the invention, which will now be described. Parts that are the same as those already described in connection with FIGS. 1 and 2 are given the same reference numerals with a double-prime ('') suffix.

On the vehicle, the taillights are designated by the reference numerals 20''R and 20''L; the turn signal lights have the reference numerals 24''R and 24'L; and the brake signal lights are designated 22''R and 22''L, respectively. The brake signal circuit of the vehicle is 28''; the right-turn signal circuit is 30''; and the left-turn signal circuit is 32''.

On the trailer, the taillights are designated 34''R and 34''L; and the combined brake-and-turn signal lights are designated 36''R and 36''L.

The adaptor device 18'' has plug-in sockets 40'', 42'' and 44'' to receive connector plugs on the vehicle, and other plug-in sockets 50'' and 52'' to receive connector plugs on the trailer. The towing vehicle taillights 20''R and 20''L are connected directly to the corresponding trailer taillights 34''R and 34''L, and this connection is not considered a part of the circuit of the device 18''.

The right-hand switching means controlling current flow to the right-hand signal light 36''R of the trailer comprises a transistor 110, two blocking diodes 112 and 114, and two current-limiting resistors 116 and 118. Resistor 116 is connected at one end to the right-turn signal circuit 30'' ahead of diode 112, and its other end is connected by a line 120 to the base of transistor 110. Resistor 118 is connected at one end to brake signal circuit 28'' ahead of diode 114, and its other end is also connected by a line 122 to the base of transistor 110. The collector of transistor 110 is connected to the right-turn signal circuit 30'', and diode 114 is connected to the brake signal circuit 28'' of the vehicle. Both diodes 112 and 114 are connected to the emitter of transistor 110.

In like manner, the left-hand switching means controlling current flow to the left-hand signal light 36''L of the trailer comprises a transistor 124, two blocking diodes 126 and 128, and two current-limiting resistors 130 and 132. Resistor 130 is connected at one end to the left-hand turn signal circuit 32'' ahead of diode 126, and its other end is connected by a line 134 to the base of tansistor 124. Resistor 132 is connected at one end to the brake signal circuit 28'' ahead of diode 128, and its other end is also connected by a line 136 to the base of transistor 124. The collector of transistor 124 is connected to the left-hand signal light 36''L. Diode 126 is connected to the left-turn signal circuit 32'', and diode 128 is connected to the brake signal circuit 28'' of the vehicle. Both diodes 126 and 128 are connected to the emitter of transistor 124.

When the right-turn signal circuit 30'' is actuated, electrical impulses from the flasher apply voltage through blocking diode 112 to the emitter of transistor 110. Base current will flow through resistor 116 and back through line 122 and resistor 118 to the brake signal circuit 28'', where it goes to ground through the filaments of brake signal lights 22''R and 22''L. The amount of current passing through the lights 22''R and 22''L is so low (due to the current-limiting effect of resistors 116 and 118) that the stop lights are not effected. Thus, transistor 110 is forward-biased, and will pass the turn signal impulses to the trailer right-hand signal light 36''R, causing the latter to flash on and off. Blocking diode 114 prevents the turn signal from being applied to the vehicle stop lights 22''R and 22''L.

A left turn signal will operate through transistor 124 in a like manner, causing left-hand signal light 36''L to flash on and off.

When the brakes are applied on the vehicle, current from the brake signal circuit 28'' is applied through blocking diodes 114 and 128, respectively. Base current for transistor 110 flows through resistor 118 and on through line 120, and resistor 116 to the right-turn signal light 24''R, where it goes to ground. At the same time, base current for tansistor 124 flows through resistor 132 and on through line 134 and resistor 130 to the left-turn signal light 24''L, where it goes to ground. Blocking diode 112 prevents the stop signal from being applied to the right-turn light 24''R, and blocking diode 126 prevents the stop signal from being applied to the left-turn signal light 24''L on the vehicle. Thus, both transistors 110 and 124 are forward-biased and will pass the stop signal to both the right-hand and left-hand signal lights 36''R and 36''L on the trailer.

Simultaneous right-turn and stop signals preclude a ground return to the base of transistor 110 through resistor from the right-turn light 24''R, causing the right-hand signal light 36''R on the trailer to be extinguished. However, during the "off" period of the right-turn signal, transistor 110 will again be forward-biased, causing it to become conductive. Thus, the right-turn stop light 36''R on the trailer will "blink" opposite the right-turn light 24''R on the towing vehicle. Transistor 124 remains unaffected, and continues to pass the stop signal to the left-hand signal light 36''L on the trailer.

Simultaneous left-turn and stop signals in the same manner as described above, except that the left-hand signal light 36''L is caused to blink opposite to the left-turn light 24''L on the vehicle, while right-hand signal light 36''R remains continuously illuminated.

Figure 4:
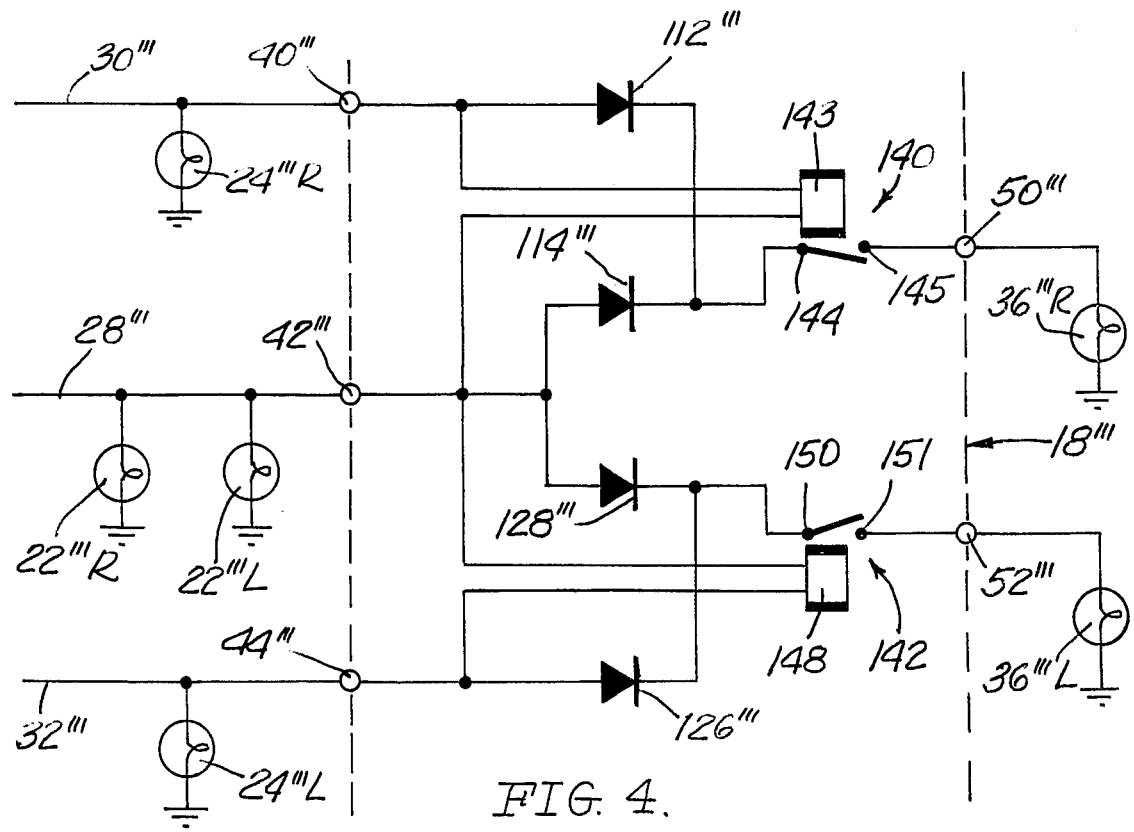
FIG. 4 is a circuit diagram of still another embodiment of the invention.

A fourth embodiment of the invention is shown in FIG. 4, where parts that are the same as those previously described are given the same reference numerals with the triple-prime (''') suffix. In this embodiment, the clearance lights (or tail lights) have been omitted. The circuit of FIG. 4 is essentially the same as the circuit in FIG. 3, except that normally-open relay switches 140 and 142 have been substituted for transistors 110 and 124. Relay switch 140 has a coil 143 and switch contacts 144 and 145. The relay coil 143 is serially connected between right-turn signal circuit 30''' and brake signal circuit 28''' on the vehicle. Relay switch contact 144 is connected to the junction of diodes 112''' and 114''', and contact 145 is connected to the filament of right-hand signal light 36'''R on the trailer.

Relay switch 142 has a coil 148 and switch contacts 150 and 151. The relay coil 148 is serially connected between left-turn signal circuit 32''' and brake signal circuit 28''' on the vehicle. Relay switch contact 150 is connected to the junction of diodes 126'''' and 128'''', and contact 151 is connected to the filament of left-hand signal light 36'''L on the trailer.

Relay switches 140 and 142 may be actuated to close their respective contacts by either the brake signal, with return to ground through the turn lamps on the towing vehicle, or by turn signal, with return to ground through the stop lights on the towing vehicle. When either relay switch 140 or 142 is closed, turn signals from the vehicle are passed through diodes 112''' or 126''' to the corresponding signal light on the trailer, while blocking diodes 114''' and 128''' prevent the turn signal from actuating the stop lights 22'''R and 22'''L on the vehicle. In like manner, brake signals from the vehicle are passed through diodes 114''' and 112''' to both signal lights 36'''R and 36'''L on the trailer, while blocking diodes 112''' and 126''' prevent the brake signal from actuating the turn signal lights 24'''R and 24'''L on the vehicle.

When both the right-turn signal and brake signal are operating, relay switch 140 is closed during the "off" period of the flasher signal, and is opened during the "on" period. This is due to the fact that when both signals are "on", there is no voltage drop across the relay coil 143, and the switch opens contacts 144, 145, thereby extinguishing the right-turn signal light 36'''R. During the "off" period of the turn flasher signal, and while the brake signal is "on" the brake signal going to relay coil 143 is allowed to pass to ground through the turn signal light 24'''R on the vehicle. The resistance of the relay coil 143 limits the amount of current going to ground, and thus there is not enough current to affect the turn signal light on the vehicle.

Thus, the right-turn signal inhibits the brake signal from actuating relay switch 140 except during the "off" period of the turn signal. The effect is to allow the brake signal to pass through blocking diode 114''' and relay contacts 144, 145 to the right-hand signal light 36'''R on the trailer when the right-turn signal is "off", and to block the brake signal when the right-turn signal is "on". The right-hand signal light 36'''R on the trailer will blink at the same rate as the turn signal on the vehicle, but 180° out of phase.

The operation of relay switch 142 responsive to simultaneously brake and turn signals is the same as described above, causing the left-hand signal light 36'''L to blink, while the right-hand signal light 36'''R remains continuously illuminated.

While I have shown and described in considerable detail what I believe to be the preferred forms of my invention, it will be understood by those skilled in the art that the invention is not limited to such details, but might take various other forms within the scope of the following claims.

What I claim is:

1. A device for adapting combined brake- and turn-signal lights of a trailer to independent brake-signal and turn-signal lights on an associated towing vehicle, said towing vehicle having right- and left-turn flasher signal circuits and a brake-signal circuit, said trailer having right-hand and left-hand signal lights, each of which has a common filament for brake- and turn-signals, said device comprising:

first switching means connected to both said right-turn flasher signal circuit and said brake-signal circuit on the vehicle, and also connected to said right-hand turn-and-brake signal light on the trailer;

second switching means connected to both said left-turn flasher signal circuit and to said brake-signal circuit on the vehicle, and also connected to said left-hand turn-and-brake signal light on the trailer;

each of said switching means being operable to transmit current from the corresponding turn flasher signal circuit or the brake signal circuit of the towing vehicle to the associated turn-and-brake signal light on the trailer when only one of said signal circuits on the vehicle is operating; and each of said switching means being operable, responsive to the combined electrical current from both the brake signal circuit and the corresponding turn flasher signal circuit on the vehicle to switch current alternately on and off to the associated turn-and-brake signal light of the trailer, when both the brakes and turn signal flasher are operating;

the other turn-and-brake signal light on the trailer remaining continuously illuminated by current from the brake-signal circuit of the vehicle.

2. A device as in claim 1, wherein said first switching means includes means responsive to an electrical impulse from said right-turn flasher signal circuit in the vehicle to switch off transmission of electrical current from said brake-signal circuit of the vehicle to said right-hand signal light of the trailer, when both the brakes and right-turn signal of the vehicle are actuated, whereby the filament of the right-hand signal light is extinguished between flashes caused by electrical impulses from said right-turn signal circuit of the vehicle, while the filament of the left-hand signal light remains continuously illuminated by current from the brake-signal circuit of the vehicle; and said second switching means includes responsive to an electrical impulse from said left-turn flasher signal circuit on the vehicle to switch off transmission of electrical current from said brake-signl circuit of the vehicle to said left-hand signal light of the trailer when both the brakes and left-turn signal of the vehicle are actuated, whereby the filament of the left-hand signal light is extinguished between flashes caused by electrical impulses from said left-hand turn signal circuit of the vehicle, while the filament of the right-hand signal light remains continuously illuminated by current from the brake-signal circuit of the vehicle.

3. The device of claim 1, wherein each of said switching means includes a voltage-sensitive device that responds to an electrical impulse from the corresponding turn-signal circuit of the vehicle to switch off transmission of current from the brake signal circuit of the vehicle to the corresponding signal light of the trailer when both the brakes and turn-signal on the vehicle are actuated.

4. A device as in claim 1, wherein said first switching means includes a first diode connecting said right-turn signal circuit on said towing vehicle to the filament of said right-hand signal light on the trailer; and a first voltage-sensitive switch connected to said right-turn flasher signal circuit on the towing and operable, when said right-turn flasher signal circuit is actuated, to turn said first switching means off, so that the brake signal circuit of the towing vehicle is prevented from energizing the filament of said right-hand signal light on the trailer when the right-turn flasher signal is operating;

said second switching means including a second diode connecting said left-turn flasher signal circuit on said towing vehicle to the filament of said left-hand signal light on the trailer; and a second voltage-sensitive switch connected to said left-turn flasher signal circuit on the towing vehicle and operable, when said left-turn flasher signal circuit is activated, to turn said second switching means off, so that the brake signal circuit of the towing vehicle is prevented from energizing the filament of said left-hand signal flasher on the trailer when the left-turn flasher signal is operating.

5. The device of claim 4, wherein said first and second switching means comprises first and second transistors, respectively, which are normally conducting, and which become non-conducting when their respective voltage-sensitive switch is actuated, thereby blocking current from said brake signal circuit of said towing vehicle to the common filament of the corresponding signal light on said trailer; said first diode being operable to transmit current from said right-turn signal circuit on said towing vehicle around said first transistor to said common filament of said right-turn signal light causes the latter to signal for a right turn; and said second diode being operable to transmit current from said left-turn signal circuit on said towing vehicle around said second transistor to said common filament of said left-turn signal to cause the latter to signal for a left turn.

6. The device of claim 5, wherein said first and second voltage-sensitive switches are silicon-controlled rectifiers (SRC), which are connected to the bases of their respective transistors, and which operate to switch off said respective transistors when actuated by voltage from the corresponding turn signal circuits.

7. A device as in claim 1, wherein said first switching means includes a first transistor having base, collector and emitter and a pair of diodes connected in parallel to the emitter thereof, one of said diodes being connected to the right-turn flasher circuit of the vehicle, and the other diode being connected to the brake signal circuit of the vehicle;

means connecting the base of said first transistor to said right-turn flasher circuit ahead of said one diode;

other means connecting the base of said first transistor to said brake signal circuit ahead of said other diode;

the filament of said right-hand signal light on the trailer being connected to the collector of said first transistor;

said first transistor becoming forward-biased so that it is conductive from emitter to collector when the brake signal is "on" and the right-turn signal is "off", and said first transistor becoming non-conductive when the brake signal is "on" and the right-turn signal is "on";

said other means connecting the base of said first transistor to said brake signal circuit serving as a ground return for current from said right-turn flasher signal circuit when the latter is "on", thereby preventing said first transistor from being forward-biased when both the brake signal and right-turn signal are "on"; and said second switching means including a second transistor and a pair of diodes connected in parallel to the emitter thereof, one of said last-named diodes being connected to the left-hand flasher circuit of the vehicle, and the other diode being connected to the brake signal circuit of the vehicle, said last-named diodes and said second transistor being connected and functioning in a manner similar to their counterparts of said first switching means.

8. A device as in claim 1, wherein said first switching means includes a normally-open first switch, the coil of which is connected serially between said right-turn flasher circuit and the brake signal circuit of the towing vehicle, said relay switch having a pair of contacts, one of which is connected to the right-hand signal light on the trailer;

a first diode connecting said right-turn flasher circuit of the vehicle to the other of said pair of contacts on said first relay switch;

a second diode connecting said brake signal circuit of the vehicle to said other contact of said first relay switch;

said first relay switch being energized to close said normally-open contacts when either said right-turn signal circuit or said brake signal circuit is "on", and de-energized when both are "on", the filament of either the brake signal lamp or the right-turn signal lamp serving as a ground return for the coil of said first relay switch when one of the lamps is "off", whereby said relay switch coil id energized by the signal circuit that is "on";

said second switching means including a normally-open second relay switch, the coil of which is connected serially between said left-turn flasher signal circuit and the brake circuit of the towing vehicle, together with first and second diodes connecting the left-turn signal circuit and brake signal circuit, respectively of the vehicle to one contact of the second relay switch, the other contact of which is connected to the filament of the left-hand signal light on the trailer, said second relay switch and said last-named diodes functioning in the same manner as in said first switching means.

* * * * *